US009908305B2

(12) United States Patent
Chamberlain et al.

(10) Patent No.: US 9,908,305 B2
(45) Date of Patent: Mar. 6, 2018

(54) FIBER ARCHITECTURE OPTIMIZATION FOR CERAMIC MATRIX COMPOSITES

(71) Applicant: Rolls-Royce Corporation, Indianapolis, IN (US)

(72) Inventors: Adam L. Chamberlain, Mooresville, IN (US); Andrew J. Lazur, Huntington Beach, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 617 days.

(21) Appl. No.: 14/208,407

(22) Filed: Mar. 13, 2014

(65) Prior Publication Data

US 2016/0136925 A1    May 19, 2016

Related U.S. Application Data

(60) Provisional application No. 61/799,241, filed on Mar. 15, 2013.

(51) Int. Cl.
*B32B 5/12* (2006.01)
*B32B 18/00* (2006.01)
*C04B 35/80* (2006.01)
*B32B 5/02* (2006.01)

(52) U.S. Cl.
CPC ............... *B32B 5/12* (2013.01); *B32B 5/022* (2013.01); *B32B 5/024* (2013.01); *B32B 18/00* (2013.01); *C04B 35/80* (2013.01); *B32B 2260/023* (2013.01); *B32B 2260/04* (2013.01); *C04B 2235/5224* (2013.01); *C04B 2235/5228* (2013.01); *C04B 2235/5244* (2013.01); *C04B 2235/5248* (2013.01); *C04B 2235/5256* (2013.01); *C04B 2235/5268* (2013.01)

(58) Field of Classification Search
CPC .. B32B 5/02; B32B 5/024; B32B 5/12; B32B 2260/00; B32B 2260/023; B32B 2260/04
See application file for complete search history.

(56) References Cited

U.S. PATENT DOCUMENTS

| 5,141,775 A | 8/1992 | Patrigeon et al. |
| 5,154,948 A | 10/1992 | Patrigeon et al. |
| 5,348,056 A * | 9/1994 | Tsuzuki ................. B29C 70/24 139/11 |

(Continued)

FOREIGN PATENT DOCUMENTS

EP    1215183 A1    4/2009

OTHER PUBLICATIONS

U.S. Appl. No. 61/799,241 by Chamberlain et al., entitled "Fiber Architecture Optimization for Improved Infiltration of SIC Based Ceramic Matrix Composites," filed Mar. 15, 2013.

(Continued)

*Primary Examiner* — Jacob Cigna
(74) *Attorney, Agent, or Firm* — Brinks Gilson & Lione

(57) ABSTRACT

Creating a ceramic matrix structure may include alternating different layers of fiber fabric to achieve porosity, infiltration, and/or other objectives. Different layers of the ceramic matrix structure may be configured differently to achieve different objectives in different regions of the ceramic matrix structure. The fiber tow spacing, fiber count and/or other characteristics may be varied within individual layers and/or among different layers of the ceramic matrix structure.

7 Claims, 7 Drawing Sheets

(56) References Cited

U.S. PATENT DOCUMENTS

| | | | |
|---|---|---|---|
| 5,989,013 A | 11/1999 | Gray | |
| 6,168,827 B1 | 1/2001 | Corman | |
| 6,838,162 B1 | 1/2005 | Gruber et al. | |
| 6,919,118 B2 | 7/2005 | Bompard et al. | |
| 7,093,359 B2* | 8/2006 | Morrison | F01D 5/282 |
| | | | 264/257 |
| 7,241,112 B2* | 7/2007 | Dambrine | B29C 70/48 |
| | | | 29/889.7 |
| 7,306,826 B2 | 12/2007 | Subramanian et al. | |
| 7,754,126 B2 | 7/2010 | Subramanian et al. | |
| 8,039,053 B2 | 10/2011 | Philippe et al. | |
| 8,060,997 B2 | 11/2011 | Wall et al. | |
| 8,216,641 B2 | 7/2012 | Bouchard et al. | |
| 2002/0076541 A1* | 6/2002 | Jarmon | C04B 35/806 |
| | | | 428/312.6 |
| 2005/0186069 A1* | 8/2005 | Subramanian | F01D 5/282 |
| | | | 415/200 |
| 2006/0284337 A1 | 12/2006 | Subramanian et al. | |
| 2008/0289743 A1 | 11/2008 | Tsotsis | |
| 2010/0081350 A1* | 4/2010 | McCabe | C04B 35/62868 |
| | | | 442/127 |
| 2010/0119777 A1* | 5/2010 | Merrill | B32B 5/26 |
| | | | 428/156 |
| 2011/0217166 A1* | 9/2011 | McMillan | F01D 5/147 |
| | | | 415/229 |
| 2011/0265406 A1* | 11/2011 | Morrison | C04B 35/80 |
| | | | 52/282.3 |
| 2011/0293828 A1* | 12/2011 | Eberling-Fux | C04B 35/52 |
| | | | 427/249.2 |
| 2011/0311368 A1* | 12/2011 | Coupe | B29C 70/222 |
| | | | 416/241 A |
| 2012/0055609 A1* | 3/2012 | Blanchard | B29C 70/24 |
| | | | 156/89.11 |
| 2012/0156460 A1 | 6/2012 | Cho et al. | |
| 2013/0089429 A1* | 4/2013 | Nunez | C04B 35/571 |
| | | | 416/230 |
| 2013/0101429 A1* | 4/2013 | Roussille | F01D 5/147 |
| | | | 416/230 |
| 2013/0108417 A1* | 5/2013 | Renon | B29B 11/16 |
| | | | 415/173.1 |
| 2013/0122763 A1* | 5/2013 | Fish | B32B 5/022 |
| | | | 442/59 |
| 2013/0210299 A1* | 8/2013 | Zhang | D03D 9/00 |
| | | | 442/6 |
| 2013/0243604 A1* | 9/2013 | Roussille | D03D 5/005 |
| | | | 416/241 A |
| 2014/0030076 A1* | 1/2014 | Nunez | F01D 5/282 |
| | | | 415/183 |
| 2014/0072443 A1* | 3/2014 | Mateo | F01D 5/282 |
| | | | 416/241 R |
| 2014/0133989 A1* | 5/2014 | Belmonte | F01D 9/02 |
| | | | 416/204 A |

OTHER PUBLICATIONS

G. Morscher et al., "Effect of Fiber Architecture Matrix Cracking for Melt-Infiltrated SIC/SIC Composites," published in the International Journal of Applied Ceramic Technology, vol. 7, issue 3, pp. 276-290 (2010).

D. Singh et al., "Effect of Fiber Architecture on Mechanical Behavior of SIC/SIC Composites," published in the Proceedings of the 21st Annual Conference on Composites, Advanced Ceramics, Materials, and Structures: A: Ceramic Engineering and Science Proceedings, vol. 18, issue 3, chapter 76 (2008).

PCT Search Report and Written Opinion for PCT/US2014/024878, dated Jun. 13, 2014.

* cited by examiner

FIBER ARCHITECTURE OPTIMIZATION FOR CERAMIC MATRIX COMPOSITES

CROSS-REFERENCE TO RELATED APPLICATION

This application claims the benefit of and priority to U.S. Provisional Patent Application Ser. No. 61/799,241, filed Mar. 15, 2013, which is incorporated herein by this reference.

FIELD OF THE DISCLOSURE

The present disclosure relates generally to ceramic matrix composites and more specifically to the local alternation of the fiber architecture of ceramic matrix composites.

BACKGROUND

Ceramic Matrix Composites (CMCs) are materials that include ceramic fibers embedded in a ceramic matrix. CMCs typically exhibit desirable mechanical, chemical and physical properties at high temperatures. For example, CMCs are typically more resistant to oxidation at high temperatures than are metals. CMCs are generally tougher than monolithic ceramics and exhibit damage tolerance. CMC components may operate at much higher temperatures than other components, including, for example, superalloy metal components.

CMCs may be produced by a variety of processes. For example, fiber interfaces of a fiber preform may be coated using chemical vapor infiltration (CVI). Illustratively, a rigidization layer may be applied by CVI, and particulates or other matter may be introduced by slurry and/or melt infiltration. The melt infiltration may react with the rigidization layer leading to performance degradations in the composite and even the fiber from this melt attack.

SUMMARY

The present application discloses one or more of the features recited in the appended claims and/or the following features which, alone or in any combination, may comprise patentable subject matter.

According to at least one aspect of this disclosure, a method of fabricating a composite material part comprising fiber reinforcement densified by a ceramic matrix includes alternating layers of fiber fabrics that have varying fiber tow spacing, and arranging the layers to minimize tow overlap and/or to create larger or smaller void spaces in different internal regions of the composite material. The layers may be different from one another. One or more of the layers may be constructed with uniform spacing between the fibers and one or more others of the layers may be constructed with different spacing between the fibers. In some embodiments, at least two of the layers may have different areal weights. In some embodiments, the areal weight may be tuned for mechanical performance and/or infiltration performance. In some embodiments, each of the layers may include a plurality of tows and all of the tows in a layer may have the same fiber count.

A composite material may be fabricated according to any of the foregoing methods. The composite material may include silicon carbide, alumina, aluminosilicate, carbon, Kevlar, and/or spectra. These and other features of the present disclosure will become more apparent from the following description of the illustrative embodiments. The composite material may include one or multiple types of fiber having the same or different tow cross sections. The composite material may include one or more single twisted tows, single untwisted tows, multiple twisted tows, served tows, or a combination of any of the foregoing. In some embodiments, each layer of the composite may include a plurality of tows, and the method may include sealing the tows so that the only remaining porosity is between the tows rather than within each tow.

DETAILED DESCRIPTION OF THE DRAWINGS

Figure 1:
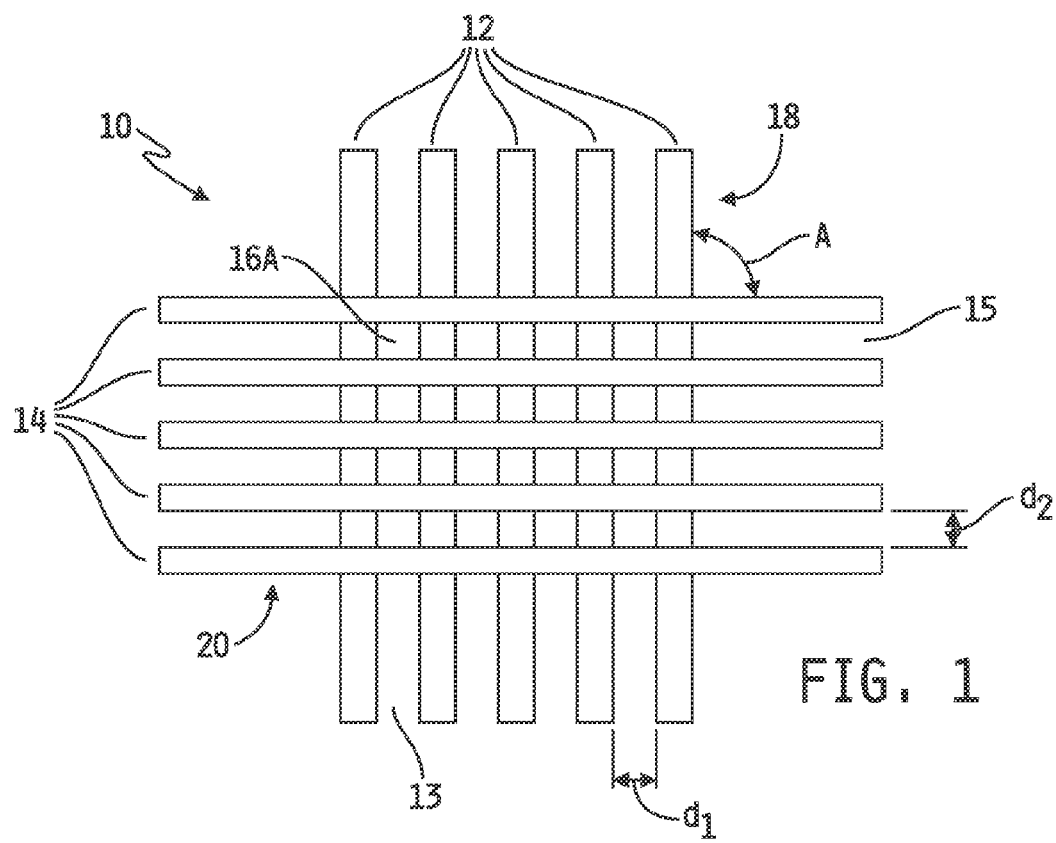
FIG. 1 is a diagrammatic top plan view of at least one embodiment of a composite material substrate showing the orientation of longitudinal and transverse tows.

For the purposes of promoting an understanding of the principles of the disclosure, reference will now be made to a number of illustrative embodiments illustrated in the drawings and specific language will be used to describe the same.

Ceramic matrix composites (CMCs) are suitable for a number of high temperature applications, such as, for example and without limitation, use in producing components of gas turbine engines. Gas turbine engines illustratively are used to power aircraft, watercraft, power generators, and the like. Local alternation of the CMC fiber architecture can enhance the mechanical properties of the ceramic matrix composites. Improvements in infiltration techniques should improve yield, reduce cycle times, reduce part cost, and increase the insertion opportunities for the CMCs.

The disclosed embodiments use alternating layers of fiber (e.g. silicon carbide, alumina, aluminosilicate, carbon, Kevlar, spectra, etc.) fabrics that have varying fiber tow spacing to create a composite material. As used herein, "tow" may refer to, among other things, an individual bundle of fiber strands or filaments. While reference is made herein to specific examples of man-made fiber materials, tows may include naturally occurring fibers, alternatively or in addition to the man-made fibers, in some embodiments. The fiber layers can be arranged to, among other things, minimize tow overlap, which can impede vapor, ceramic particulate, or melt infiltrated products in a continuous fiber reinforced ceramic matrix composite. In some embodiments, the layers of fiber fabric may be arranged to cause disruptions in the infiltration process, if desired. In some embodiments, the layers of the fabric architecture are arranged to create blockage in order to prevent the flow of gas, liquid, or another substance to certain areas of the composite material. In some embodiments, a non-crimp or non-woven fabric may be used alternatively or in addition to a woven fabric. For example, in some embodiments, use of a non-crimp or non-woven fabric can prevent fiber tow crossovers, which can result in blockages of open spaces in local regions of the composite material. Such blockages may prevent infiltration to localized regions of the composite material. Accordingly, non-crimp or non-woven fabric may be used in regions of the composite in which maximum infiltration or minimal porosity is required or desired, to, for instance, limit choke points.

In accordance with this disclosure, the fiber architectures of at least some of the various layers of the CMC are different from one another in one or multiple ways. For example, in some embodiments, the composite materials (e.g., textiles) may be constructed with uniformly spaced tows in some or all of the layers but with different tow spacing between some of the layers (e.g., from one layer to the next), where the tow spacing may be measured in ends per inch (epi). The composite materials may exhibit varying areal weights in different layers (tuned for, e.g., mechanical performance, infiltration performance, or both). The composite materials may utilize the same fiber count within all of the tows or a variable fiber count; e.g., a fiber count that is different in some of the tows than in other tows. For example, a 900 denier silicon carbide (SiC) fiber may be used in some positions while an 1800 denier fiber is used in other positions. In addition to tow width variation when viewed from above, such variations can create void spaces within the composite material, e.g., for lateral gas/liquid movement, where the smaller bundle is not completely in contact with the layers above and/or below. The composite material may be comprised of one or multiple types of fiber (of the same or different tow cross sections). The composite material may comprise, for example, single untwisted tows, single twisted tows (to varying levels), multiple twisted tows, or served tows. In some embodiments, non-woven fabrics may be inserted into one or more of the fiber layers to, for example, eliminate points of constriction.

Embodiments of the disclosed process may be employed for simple fabrics and/or multi-layer laminates. The mechanics of achieving such architectures are within the capabilities of advanced textile manufacturers. The benefits of the disclosed process for creating a fiber architecture for a ceramic matrix composite produced by chemical vapor infiltration (CVI) can include, for example, improved gas access to the deeper layers of the composite material (so that the composite material is less subject to random complete blockages, as with uniformly spaced fabrics), which can result in more consistent material properties. Embodiments may also be advantageous for processes that densify a matrix by infiltration of a polymer (including products that retain a polymer for use in the final product, like carbon/epoxy and products that convert the polymer to an inorganic form like carbon or silicon carbide). Some embodiments may be particularly helpful for resin infusion processes, where through thickness permeability can result in defects in the matrix. Some embodiments may reduce infiltration time, which has a significant cost benefit from cycle time, but may also reduce access ports and increase the size of a part that can be infiltrated before a critical curing stage is reached.

For a typical CVI-based ceramic matrix composite, initially porosity and related permeability exist within individual tows; however. In some embodiments, once the tows are completely sealed, the only remaining porosity is between the tows. Additionally, if subsequent processes involve liquid and/or solid phase infiltration (like a slurry), then more consistent intertow spaces can improve part uniformity. Some embodiments can result in the improved infiltration of thick components (where "thick" may be used herein to mean, among other things, a component thickness in the range of about 0.25 inches or greater). Some embodiments can reduce defects in critical stress regions (e.g., regions that are subject to maximum tensile stress, during operation of a turbine engine of which the material is a part, for example). Some embodiments can improve part yield as a result of manufacture according to the disclosed process. Some embodiments can increase infiltration rates as a result of improved access to areas of the material where infiltration is desired, thereby reducing cycle time and providing a cost benefit. In some cases, a tooling reduction or tooling simplification can result from the improved infiltration characteristics realized through the use of the disclosed process. Further, as disclosed herein, various layers of the CMC have different characteristics, which can be detected when imaged by computerized tomography (CT) or other means. As a result, the validation of the fiber architecture can be improved (e.g., the process of verifying the correctness of the architecture vis a vis its design), thereby improving quality assurance methods.

Referring now to FIG. 1, there is shown a simplified schematic view of an arrangement of individual fiber tows 12, 14 for a composite material 10. As described in more detail below, the illustrative composite material 10 includes a layer (or ply) 18 and another layer (or ply) 20, where portions of the tows 14 of the layer 20 are supported by (e.g., positioned on top of) portions of the tows 12 of the layer 18. As should be understood, in woven embodiments, portions of the tows 12 of the layer 18 may be supported by portions of the tows 14 of the layer 20, and vice versa. The layer 18 includes a number of the tows 12, which are arranged in a longitudinal (e.g., "warp," in the case of woven fibers) direction. The layer 20 includes a number of the tows 14, which are arranged in a transverse direction with respect to the longitudinal tows 12 (e.g., a "weft" direction, in the case of woven fibers). Each of the individual tows 12, 14 is constructed of a fiber fabric or fiber bundle, which may include a woven material, a non-woven material, a non-crimp material, and/or other fiber material. Some of the tows 12, 14 may be constructed of different fiber materials, or fiber materials having different characteristics, than the fiber material from which other tows are constructed. The transverse tows 14 are oriented at a predefined angle A, with respect to the direction of the longitudinal tows 12. In FIG. 1, the angle A is shown as approximately ninety degrees; however, the angular orientation of the tows 14 with respect to the tows 12 may be varied according to the requirements of a particular composite material. The angular orientation of either the tows 12 or the tows 14 may, in some embodiments, correspond to a longitudinal axis of the resulting part that is formed from the composite material (e.g., a longitudinal axis of a blade of a turbine engine).

In the embodiment of FIG. 1, the tows 12 are uniformly spaced from one another by intertow spaces 13, each of which has the same intertow distance, $d_1$. Likewise, the tows 14 are uniformly spaced from one another by intertow spaces 15, each of which has the same intertow distance, $d_2$. In other embodiments, the spaces 13 separating the individual tows 12 of the layer 18 and/or the spaces 15 separating the individual tows 14 may be non-uniform, in accordance with the requirements of the composite material. Within the fiber structure, the longitudinal tows 12 intersect with the transverse tows 14 to define void spaces 16A.

Figure 2:
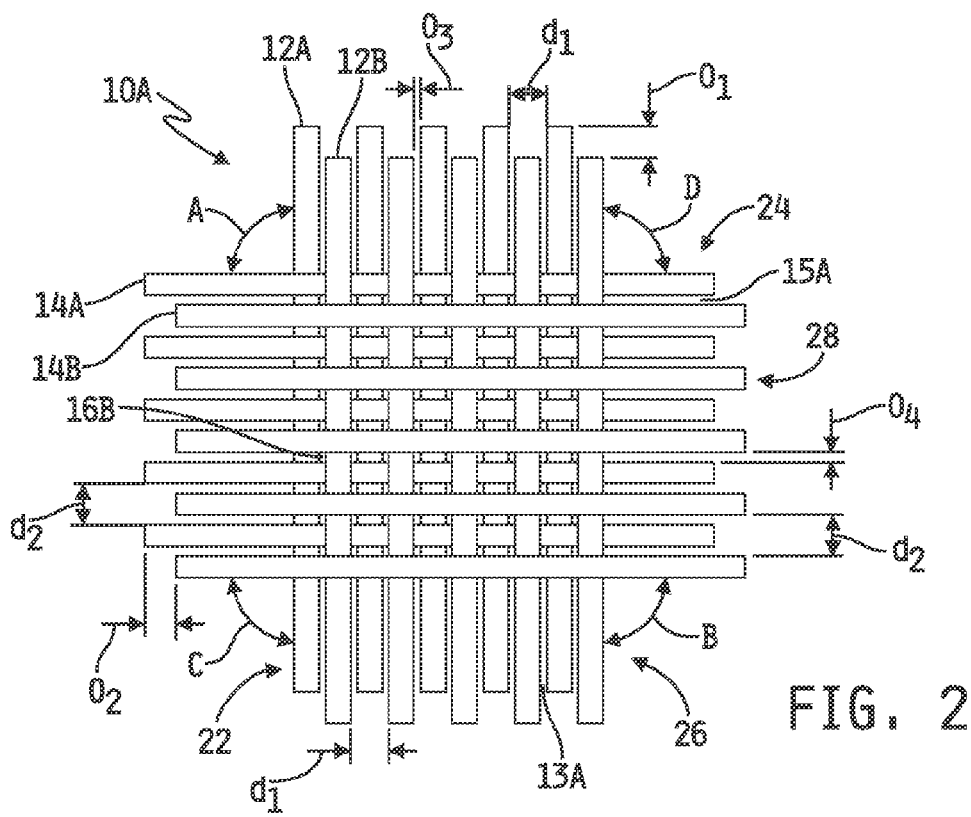
FIG. 2 is a diagrammatic top plan view of at least one embodiment of a composite material formed using the substrate of FIG. 1.
Figure 3:
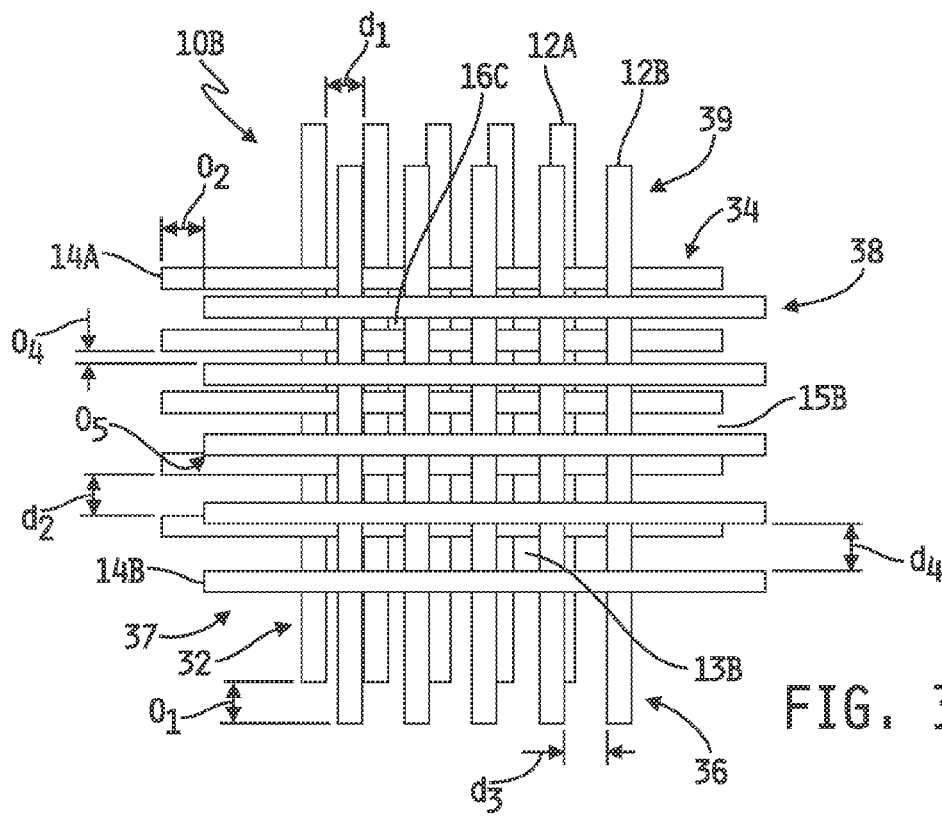
FIG. 3 is a diagrammatic top plan view of at least one embodiment of another composite material formed as disclosed herein.
Figure 4:
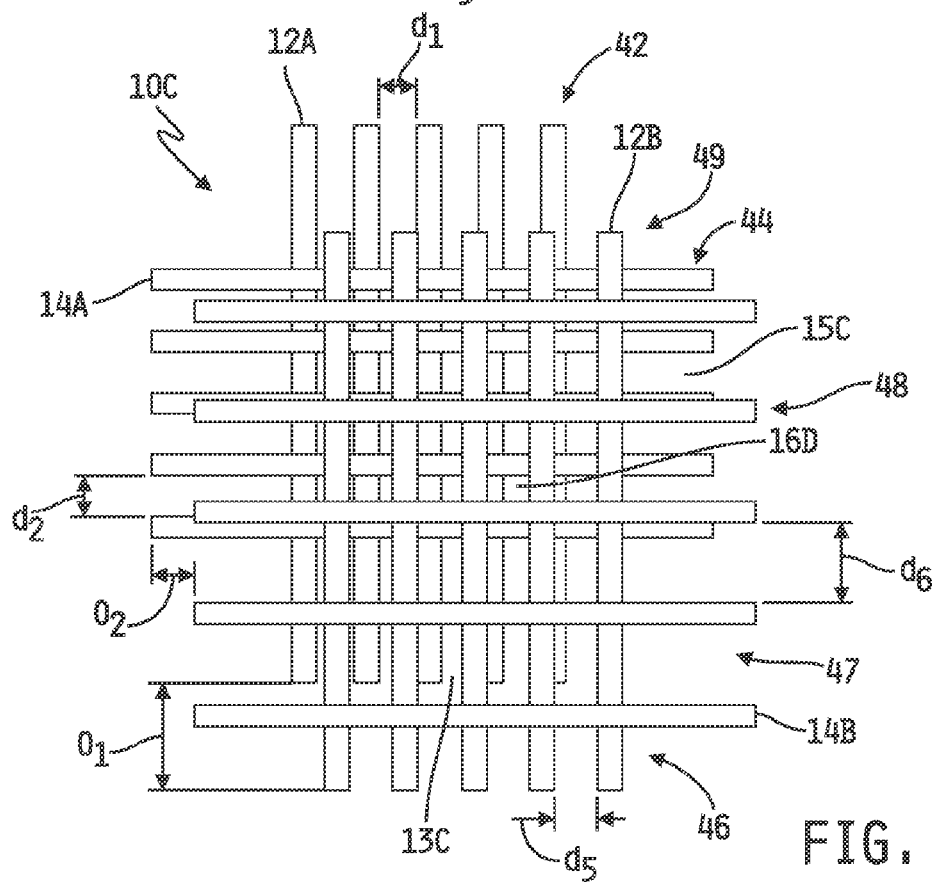
FIG. 4 is a diagrammatic top plan view of at least one embodiment of another composite material formed as disclosed herein.

As shown in FIGS. 2-4, embodiments of the disclosed methods can vary the ends per inch (epi) values for the fiber tows in the longitudinal and/or the transverse direction, to provide staggering of the tows within a single layer and/or across multiple layers of a composite material. In some embodiments, the variation in the epi can increase the degree of the staggering of the fiber tows to increase the percentage of open channels within the composite material to, for example, facilitate vapor, particulate, or melt product infiltration.

FIGS. 1-4 show simplified views of composite materials with varying fiber spacing to create differently-sized regions of open space ("void spaces") within the fiber architecture. The composites 10, 10A, 10B each include longitudinal tows 12, 12A, 12B, transverse tows 14, 14A, 14B, and open or void spaces therebetween, 13, 13A, 13B, 13C, 15, 15A, 15B, 15C. In the illustrative embodiment of FIG. 2, the tows 12A, 14A are ply 1, 16 epi×16 epi; the tows 12B, 14B are ply 2, 16 epi×16 epi, and the spacing 13A, 15A is in the range of about 1% open (void) space. In the illustrative embodiment of FIG. 3, the composite 10B differs from the composite 10A of FIG. 2 in that the tows 12B, 14B are ply 2, 14×14 epi and the spacing 13B, 15B is in the range of about 3.5% open (void) space. The tows 12A, 14A are ply 1, 16×16 epi. In the illustrative embodiment of FIG. 4, the composite 10C differs from the composites of FIGS. 2 and 3 in that the tows 12A, 14A are ply 1, 16 epi×16 epi, but the tows 12B, 14B are ply 2, 14 epi×8 epi, and the spacing 13C, 15C is in the range of about 7% open space.

In FIGS. 2-4, the effect of varying fiber spacing on the open (e.g., infiltration) area is shown by varying the longitudinal epi×transverse epi from the ply 1 to the ply 2. As shown in these embodiments, ply 1 is on the bottom. The amount of open space within the structure can be determined by, for example, contrast analysis. In FIGS. 2-4, the longitudinal and transverse tows of ply 2 are aligned with the void spaces created between the longitudinal and transverse tows of ply 1. This alignment of the tows of ply 2 with respect to the tows of ply 1 results in almost a complete blockage of open space in the local regions where such alignments occur. In the case of two plies that are 16 epi×16 epi (e.g., FIG. 2), the blockage of open space translates across the two plies of fabric. Such an arrangement limits the amount of open space that is available within the structure for, e.g., infiltration. However, if the epi of the second fabric ply is varied to create staggering as shown in FIGS. 3-4, the amount of open space within the structure can be increased. It should be understood that the calculations used to compute the amount of open space, resulting in the percentage values mentioned above, disregard the open spaces that may be present in the individual fiber tows (e.g., bundles) themselves.

Referring now in more detail to FIG. 2, the composite material 10A includes a layer 22 of uniformly spaced longitudinal tows 12A, followed by a layer 24 of uniformly spaced transverse tows 14A, followed by a layer 26 of uniformly spaced longitudinal tows 12B, followed by a layer 28 of transverse tows 14B. The transverse tows 14A are oriented at the angle A with respect to the longitudinal tows 12A. Similarly, the transverse tows 14B are oriented at an angle B with respect to the longitudinal tows 12B; the transverse tows 14B are oriented at an angle C with respect to the longitudinal tows 12A, and the transverse tows 14A are oriented at an angle D with respect to the longitudinal tows 12B. In the illustrative embodiment, each of the angles A, B, C, D is substantially the same and in the range of about ninety degrees. In other embodiments, any of the angles A, B, C, D may be varied according to the requirements of a particular composite material.

Additionally, in the embodiment of FIG. 2, the longitudinal tows 12B are longitudinally displaced from the longitudinal tows 12A by a longitudinal offset, $O_1$, and the transverse tows 14B are transversely displaced from the transverse tows 14A by a transverse offset, $O_2$. The size the offsets $O_1$, $O_2$, may be the same or different, and may be determined through computation or experimentation based on the requirements of a particular composite material. However, there is uniform spacing between the individual tows 12A, between the individual tows 12B, between the individual tows 14A, and between the individual tows 14B. As a result of this configuration, a measurement $O_3$ of an amount void spacing 13A is defined between the longitudinal tows 12A, 12B, and a measurement $O_4$ of an amount of void spacing 15A is defined between the transverse tows 14A, 14B. The longitudinal and transverse tows 12A, 12B, 14A, 14B intersect to form void spaces 16A within the composite material 10A. In FIG. 2, the distances $d_1$, $d_2$ are substantially as described with reference to FIG. 1, above.

Referring now in more detail to FIG. 3, the composite material 10B includes a layer 32 of longitudinal tows 12A, followed by a layer 34 of transverse tows 14A, followed by a layer 36 of longitudinal tows 12B, followed by a layer 38 of transverse tows 14B. The layers 32, 34 form a substrate 37, while the layers 36, 38 form a substrate 39. The longitudinal tows 12B are longitudinally displaced from the longitudinal tows 12A by the longitudinal offset, $O_1$, and the transverse tows 14B are transversely displaced from the transverse tows 14A by the transverse offset, $O_2$, as described above. Additionally, there is uniform spacing between the individual tows 12A, between the individual tows 12B, between the individual tows 14A, and between the individual tows 14B. However, the spacing between the longitudinal tows 12B, defined by a distance $d_3$, is different than the distance $d_1$, described above, and the spacing between the transverse tows 14B, defined by a distance $d_4$, is different than the distance $d_2$, described above. More specifically, in the illustrated embodiment, the distance $d_3$ is greater than the distance $d_1$ and the distance $d_4$ is greater than the distance $d_2$. Thus, the spacing between the longitudinal tows 12A and the longitudinal tows 12B is non-uniform, and the spacing between the transverse tows 14A and the transverse tows 14B is also non-uniform, as shown by the difference between the spacing $O_4$ and the spacing $O_5$ (where the spacing $O_5$ is negative in the sense that the transverse tow 14B overlaps with a portion of the transverse tow 14A). As a result, the composite material contains differently sized void spaces in different local regions of its internal structure. For example, as shown, the void space 13B is larger than the void space 16C. In FIG. 3, the distances $d_1$, $d_2$ are substantially as described with reference to FIG. 1, above.

The disclosed embodiments can be used on any two-dimensional or three-dimensional fabric or preform. The staggering of fiber or removal of fiber tows may be based on, for example, geometry and/or stress (e.g., tensile stress) requirements. The melt infiltration (MI) efficiency of the composite material can be impacted by the orientation of the architecture with respect to the direction of infiltration. Referring to FIG. 4, the direction of infiltration is along the high epi (longitudinal, in this case) direction. Aligning the direction of infiltration with the high epi direction can provide, for example, increased wetting surfaces. A reduction in epi in the opposing direction (transverse, in this case) can, for example, decrease constriction points.

In FIG. 4, the composite material 10C includes a layer 42 of uniformly spaced longitudinal tows 12A, followed by a layer 44 of uniformly spaced transverse tows 14A, followed by a layer 46 of uniformly spaced longitudinal tows 12B, followed by a layer 48 of uniformly spaced transverse tows 14B. The layers 42, 44 comprise a substrate 47, and the layers 46, 48 comprise a substrate 49. The distances d1, d2 and spacings O1, O2 are substantially as described above; however the intertow distance d5 between the longitudinal tows 12B is different than the distance $d_1$, and the intertow distance $d_6$ between the tows 14B is different than the distance $d_2$. More particularly, in the illustrative embodiment, the distance $d_5$ is larger than the distance $d_1$ and the distance $d_6$ is larger than the distance $d_2$ and the distance $d_4$. Thus, the spacing between the longitudinal tows 12A and the longitudinal tows 12B is non-uniform, and the spacing between the transverse tows 14A and the transverse tows 14B is also non-uniform. As a result, the composite material contains differently sized void spaces in different local regions of its internal structure. For example, as shown, the void space 13C is larger than the void space 16D.

Figure 5:
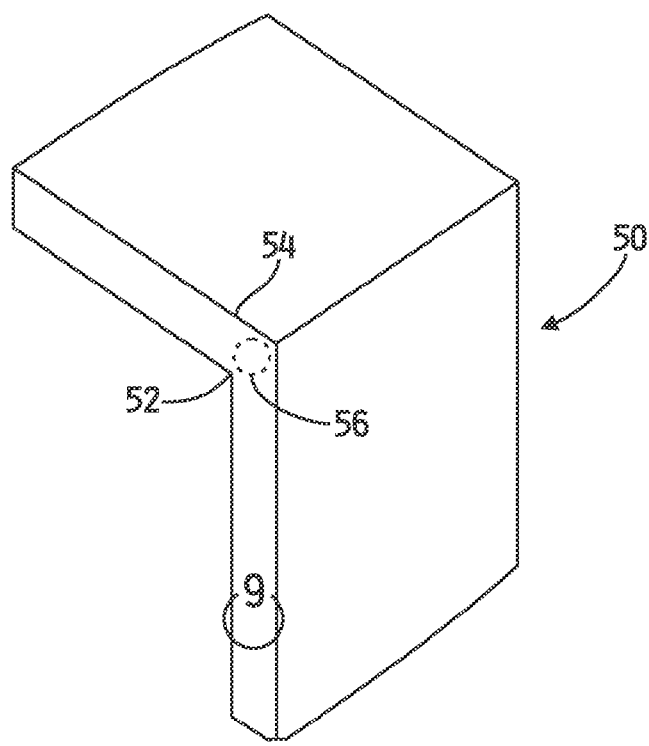
FIG. 5 is a simplified perspective view of at least one embodiment of a part created using a composite material formed as disclosed herein.

Another example of the construction of a composite material as disclosed herein is illustrated by FIGS. 5-9. Referring to FIG. 5, the example uses a more complex shape, in which various fabric architectures are layered in order to enhance infiltration through the outer surface and along the fiber length of the longitudinal fibers. Illustratively, the example comprises a right angle bracket 50. An interior region of the bracket is defined by an inner surface 52 and an outer surface 54. Within the interior region, a region of interest or "critical" region 56 exists. Illustratively, the region 56 is at the center of the radius of the right angle defined by the bracket 50.

Figure 6A:
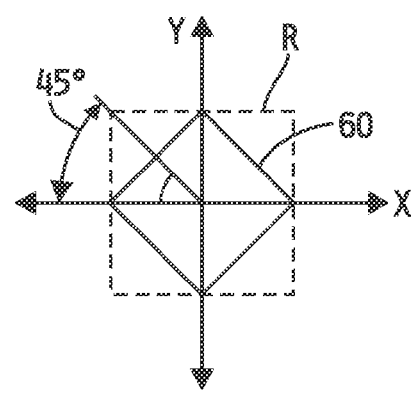
FIG. 6A is a simplified graphical depiction of an angular orientation of a substrate of a composite material in relation to another substrate of the composite material.

In the bracket 50, infiltration access to the center of the radius in the angle is maintained. To do this, a fabric lay-up with 8 plies is used. The plies are as follows, moving from the inner surface 52 to the outer surface 54: a 45° layer of fabric with tow count and epi of 900 denier×1800 denier and 8 epi×10 epi, respectively; a 90° layer of fabric with tow count and epi of 900 denier×1800 denier and 8 epi×10 epi, respectively; a 90° layer of fabric with tow count and epi of 900 denier×1800 denier and 8 epi×10 epi, respectively (this third layer can be positioned with respect to the second layer in order avoid channel blockage); a 90° layer of fabric with tow count and epi of 1800 denier×1800 denier and 16 epi×16 epi, respectively; a 90° layer of fabric with tow count and epi of 1800 denier×1800 denier and 16 epi×16 epi, respectively; a 90° layer of fabric with tow count and epi of 900 denier×1800 denier and 8 epi×10 epi, respectively; a 90° layer of fabric with tow count and epi of 900 denier×1800 denier and 8 epi×10 epi, respectively (this seventh layer can be positioned with respect to the sixth layer in order avoid channel blockage); and a 45° layer of fabric with tow count and epi of 900 denier×1800 denier and 8 epi×10 epi, respectively. In this example, the fabric 1800 denier fiber tows would be oriented along the length of the bracket 50. This can provide maximum infiltration along the axial and radial direction (e.g., along the contour) of the bracket 50. The open surfaces provided by layers 1-3 and 6-8 can be enhanced through thickness infiltration. In the bracket 50, the fourth and fifth layers are constructed of a standard fabric that can allow rapid infiltration along the length of the fiber bundles. FIG. 6A illustrates the orientation of the layer 60 with respect to a reference layer R, with the orientation being in the range of about 45 degrees. The reference layer R is, for example, a preceding layer of the composite material. Such a preceding layer may be made up of the substrate 70, as shown in FIG. 9, described below.

Figure 6:
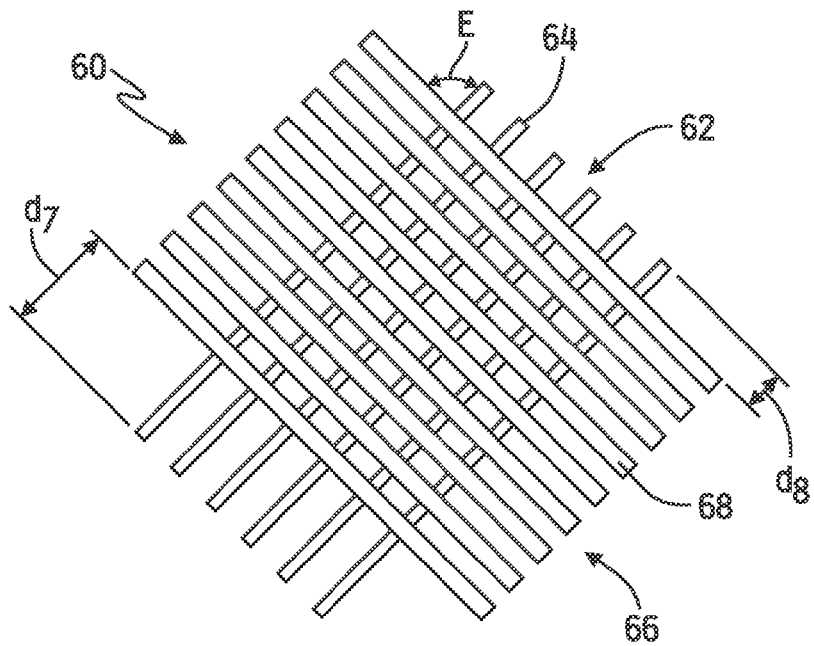
FIG. 6 is a diagrammatic top plan view of at least one embodiment of another composite material substrate formed as disclosed herein.
Figure 7:
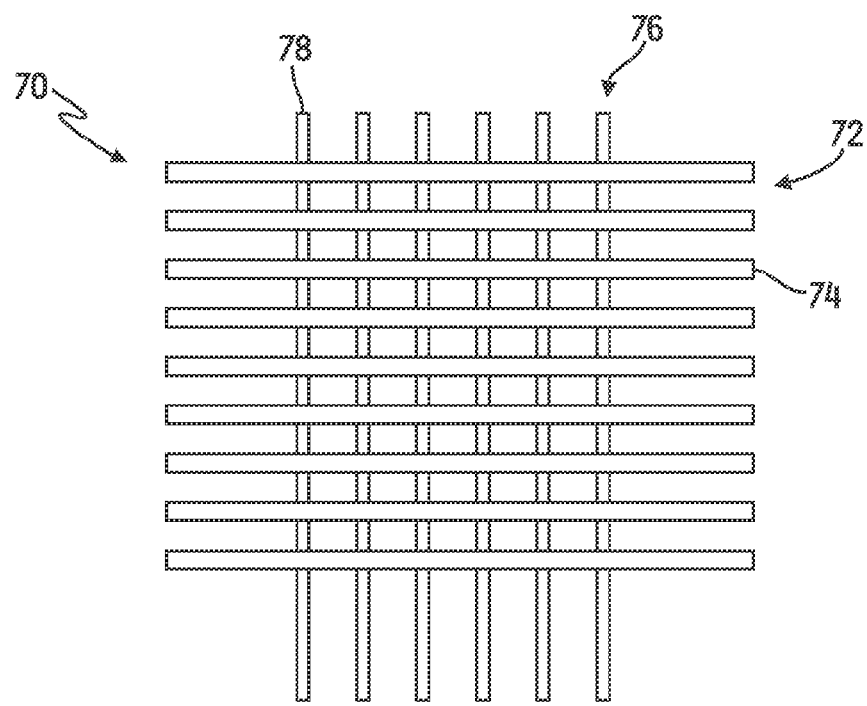
FIGS. 7 and 8 are diagrammatic top plan views of embodiments of other composite material substrates formed as disclosed herein.
Figure 8:
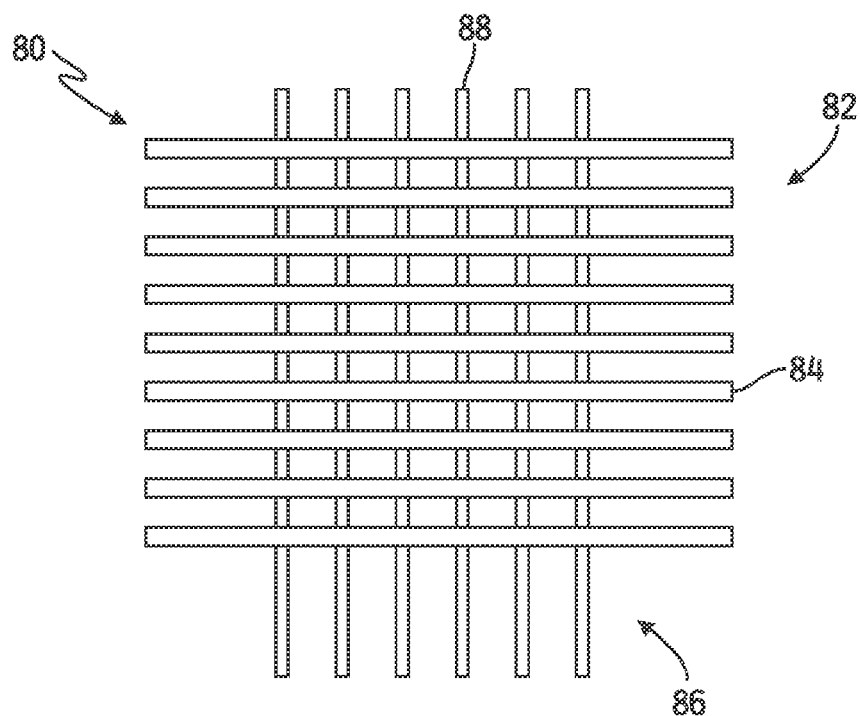
Figure 9:
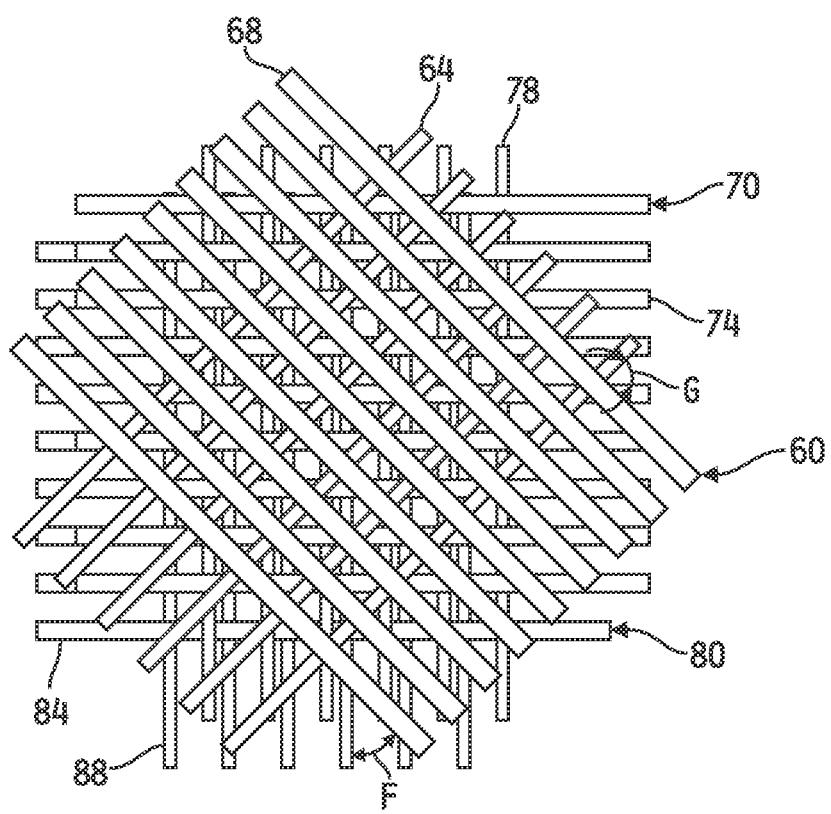
FIG. 9 is a diagrammatic top plan view of at least one embodiment of a composite material formed using the substrates of FIGS. 6, 7, and 8.

FIG. 9 shows the composite resulting from the layering of the substrates 60, 70, 80 of FIGS. 6-8. In this example, the substrate 80 of FIG. 8 includes plies 3 and 8 above, and is the bottom layer. The substrate 70 of FIG. 7 includes plies 2 and 7 above, and is the middle layer. The substrate 60 includes plies 1 and 8, and is the top layer.

Figure 10:
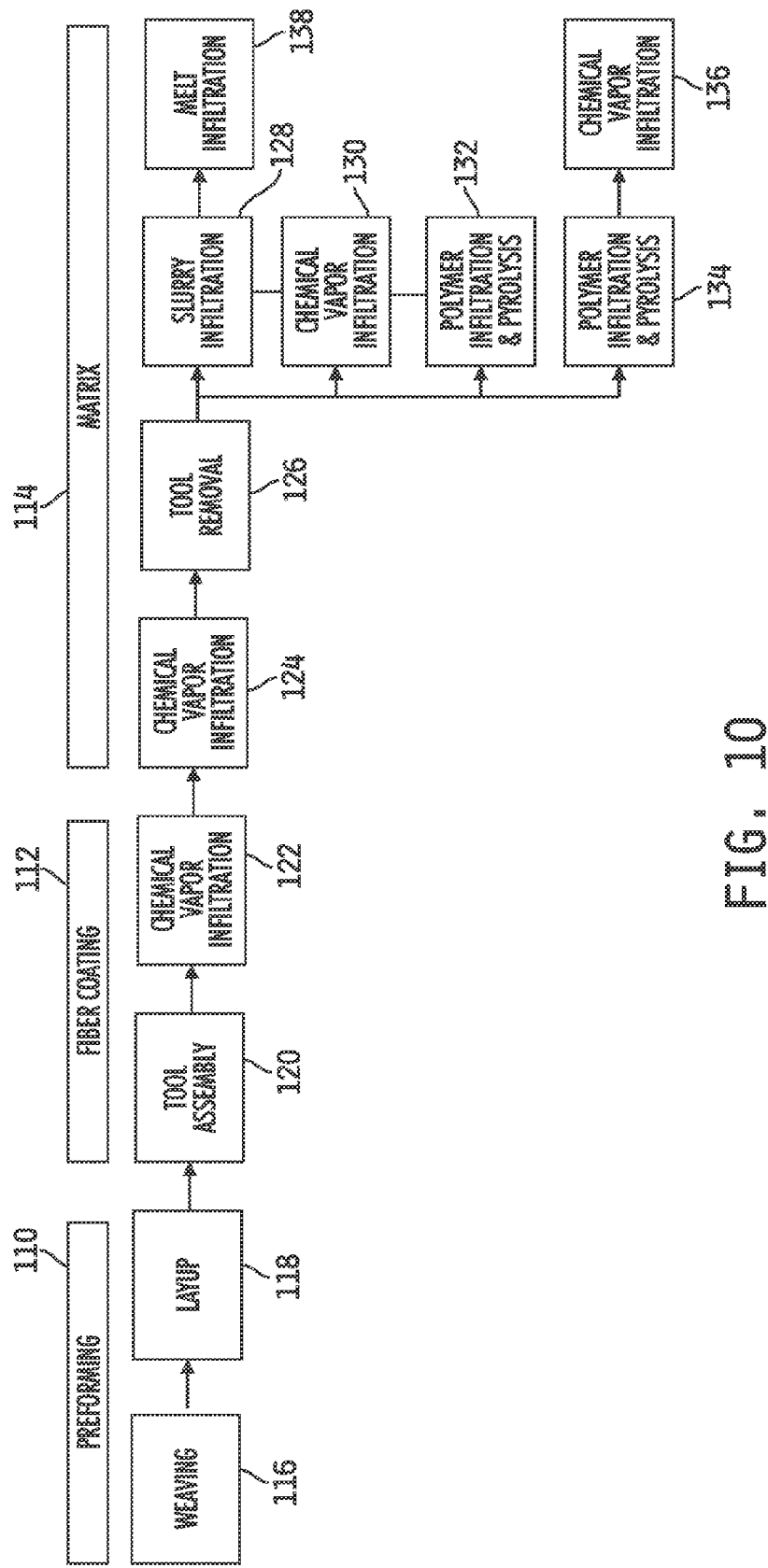
FIG. 10 is a flow diagram of an illustrative process for creating a ceramic matrix composite.

Referring now to FIG. 10, an illustrative process for CMC manufacture is shown. The illustrative process includes a preforming phase 110, a fiber coating phase 112, and a matrix phase 114. During the preforming phase 110, weaving 116 is followed by layup 118. During the weaving 116, the plies may be constructed with varying tow spacing and/or other differing characteristics as disclosed herein. During the layup 118, the plies may be layered and staggered as disclosed herein.

In the illustrative example, the fiber coating phase 112 follows the preforming phase 110. In the fiber coating phase 112, tool assembly 120 is followed by chemical vapor filtration 122. The matrix phase 114 follows the fiber coating phase 112. The matrix phase 114 includes chemical vapor infiltration 124 followed by tool removal 126. Tool removal 126 may be followed by slurry infiltration 128, chemical vapor infiltration 130, and/or one or more rounds of polymer infiltration 132 and pyrolysis 134. Polymer infiltration pyrolysis 134 is followed by chemical vapor infiltration 136. Melt filtration 138 follows slurry infiltration 128 or chemical vapor infiltration 136.

Figure 11:
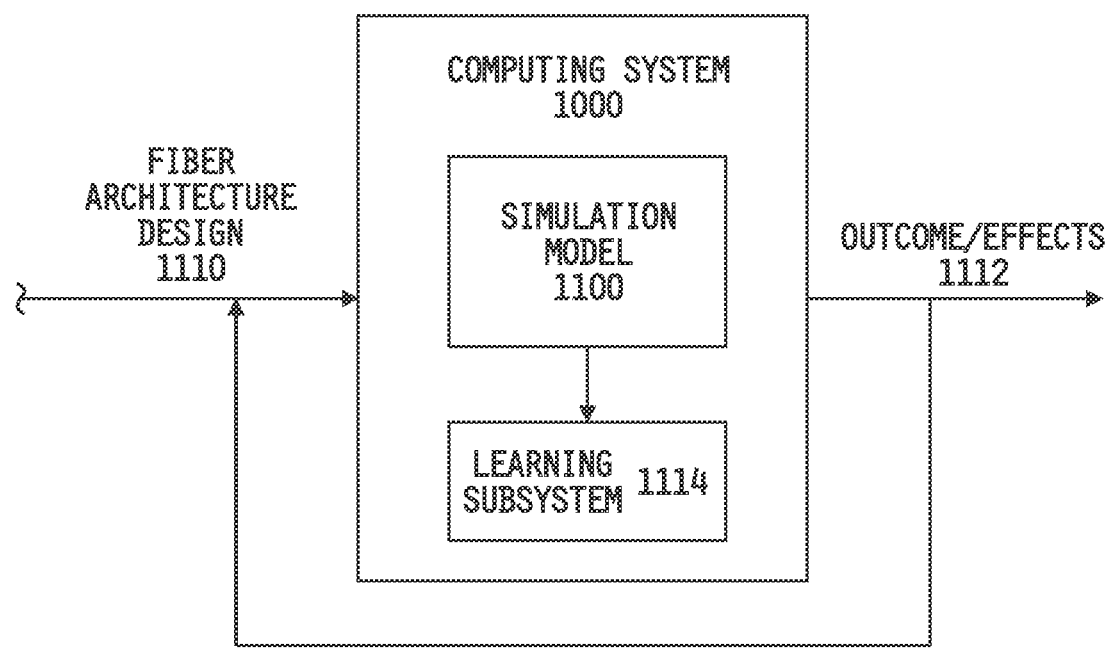
FIGS. 11-12 are simplified block diagrams of aspects of at least one embodiment of a computing system for designing a fiber architecture for a ceramic composite substrate as disclosed herein.
Figure 12:
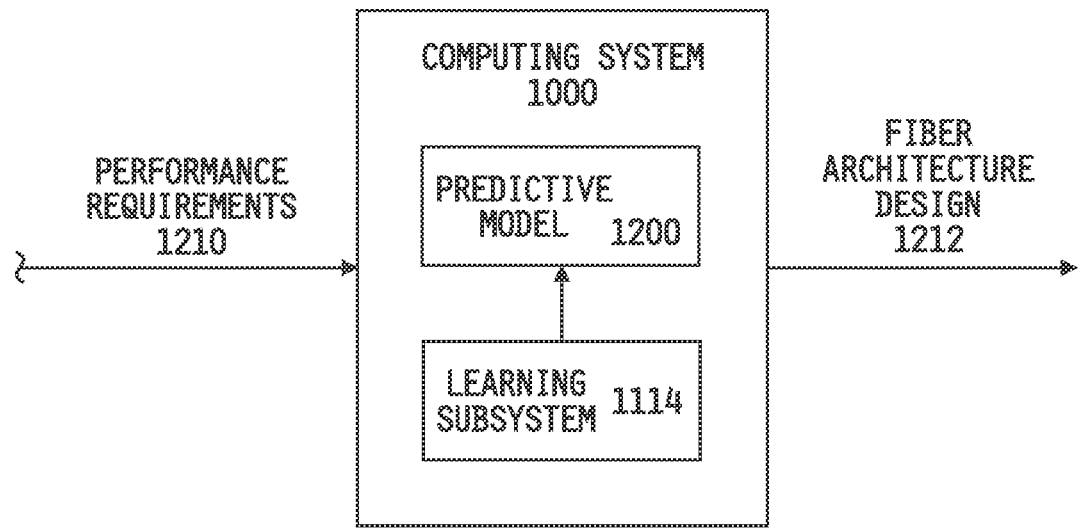

Referring now to FIGS. 11-12, a computing system 1000 is configured to automate the process of designing a fiber architecture for a CMC using the methods and techniques disclosed herein. While not specifically shown, it should be understood that the computing system 100 is embodied to include a processor (e.g., a microprocessor, microcontroller, and/or digital signal processor), computer memory, a data storage device, an input-output subsystem, a user interface subsystem (which includes one or more user input and output devices, such as keyboards, touchpads, display screens, etc.), a communications subsystem (which includes one or more wired or wireless network interfaces), and electrical circuitry communicatively coupling the various components of the computing system. For example, the computing system 1000 may be embodied as a mobile or desktop computing device, a server, a networked computing system, or a combination thereof.

The computing system 1000 is configured to operate a simulation model 1100, a learning subsystem 1114, and a predictive model 1200. The simulation model 1100, the learning subsystem 114, and the predictive model 1200 are embodied as computer-executable components, such as software, hardware, or a combination thereof. Through, for example, the user interface subsystem or the communications subsystem, the simulation model 1100 receives input 1110, which includes information about a fiber architecture design. The fiber architecture design may be an existing or a proposed design. The input 1110 includes, for example, the number of plies, the arrangement of plies (e.g., staggering), the angular orientation of plies, tow spacing, fiber count, fabric type, and/or other information about the fiber architecture. The simulation model analyzes the input 1110 and outputs information relating to the anticipated outcome or effects of the design as input. To do this, the simulation model 1100 compares the input 1110 to information about various fiber architecture designs and outcomes or effects that have been observed through the usage and/or testing of such designs and/or similar designs. Such information is collected over time (e.g., by user input) and stored in a database of the learning subsystem 1114. The simulation model 1100 determines the outcome/effects 1112 based on the similarity of the input 1110 to various instances of the stored information in the learning subsystem 1114. The determined outcome/effects 1112 are then presented to the user (e.g., via a display screen of the computing system 1000). Additionally, the outcome/effects 1112 and the associated input 1110 are fed back into the computing system 1000 and stored in the learning subsystem 1114. Thus, as various designs 1110 are analyzed by the simulation model 1100, the results of each such analysis are incorporated into the simulation model 1100 via the learning subsystem 1114.

Referring to FIG. 12, the learning subsystem 1114 makes the stored information, e.g., data relating to various combinations of fiber architecture design requirements and the resulting outcome/effects 1112, available to the predictive model 1200. With the predictive model 1200, the computing system 1000 can generate a suggested fiber architecture design 1212 based on performance requirements input 1210. Such requirements may include, for example, information about the type of manufacturing process to be employed (e.g., slurry, chemical vapor infiltration, etc.), tensile stress requirements, porosity requirements, and/or mechanical requirements. The predictive model 1200 leverages the information produced by the simulation model 1100 and other information stored in the learning subsystem 1114 to make predictions as to fiber architecture designs that are most likely to meet the desired performance requirements 1210. To do this, the predictive model 1200 may use pre-defined rules, statistical or probabilistic analysis techniques, which are implemented in computer code of the predictive model 1200.

Illustrative examples of the technologies disclosed herein are provided below. An embodiment of the technologies may include any one or more, and any combination of, the examples described below.

Example 1 includes a method of fabricating a composite material part for a turbine engine, the composite material comprising fiber reinforcement densified by a ceramic matrix, the method comprising the steps of: alternating layers of fiber fabric, each layer of fiber fabric comprising a plurality of fiber tows, at least two of the layers having a different fiber tow spacing, and arranging the layers to minimize overlap of the fiber tows.

Example 2 includes the method of Example 1, comprising arranging the layers to create varying-sized void spaces within the composite material.

Example 3 includes the method of Example 1 or Example 2, comprising positioning the fiber tows of a layer of the fiber fabric at an offset with respect to the position of the fiber tows of another layer of the fiber fabric in the composite material.

Example 4 includes the method of Example 3, wherein each of the layers of fiber fabric comprises a plurality of longitudinal tows arranged in a longitudinal direction and a plurality of transverse tows arranged in a transverse direction with respect to the longitudinal tows, and the method comprises positioning the longitudinal tows of the layer of the fiber fabric at a longitudinal offset with respect to the position of the longitudinal tows of the other layer of the fiber fabric.

Example 5 includes the method of Example 4, comprising positioning the transverse tows of the layer of fiber fabric at a transverse offset with respect to the position of the transverse tows of the other layer of fiber fabric.

Example 6 includes the method of Example 5, comprising spacing the longitudinal tows of the other layer of fiber fabric to align the longitudinal tows of the other layer of fiber fabric with void spaces between the longitudinal tows of the layer of fiber fabric.

Example 7 includes the method of Example 6, comprising spacing the transverse tows of the other layer of fiber fabric to align the transverse tows of the other layer of fiber fabric with void spaces between the transverse tows of the layer of fiber fabric.

Example 8 includes the method of any of the preceding Examples, comprising orienting a layer of the fiber fabric at an acute angle with respect to the orientation of another layer of the fiber fabric in the composite material.

Example 9 includes the method of any of the preceding Examples, comprising arranging longitudinal and transverse tows of a first layer of the composite material to create void spaces within the composite material, and arranging longitudinal and transverse tows of a second layer of the composite material to change the size of the void spaces within the composite material.

Example 10 includes the method of Example 9, comprising arranging the longitudinal and transverse tows of the second layer to create differently sized void spaces in different portions of the composite material.

Example 11 includes the method of Example 9, comprising aligning the longitudinal and transverse tows of the second layer with the void spaces to minimize the size of the void spaces within the composite material.

Example 12 includes a composite material comprising: a layer of fiber fabric, the layer comprising a plurality of longitudinal tows of the fiber fabric, the longitudinal tows oriented in a longitudinal direction, and a plurality of transverse tows of the fiber fabric, the transverse tows oriented in a transverse direction, wherein the transverse tows are arranged with the longitudinal tows to define a plurality of void spaces in the composite material, and the arrangement of the longitudinal tows and the transverse tows is defined based on at least one of: a porosity requirement of the composite material and an infiltration requirement of the composite material.

Example 13 includes the composite material of Example 12, wherein the plurality of transverse tows are arranged to have a different tow spacing than the tow spacing of the longitudinal tows.

Example 14 includes the composite material of Example 12 or Example 13, comprising a second layer of the fiber fabric, wherein the layer of the fiber fabric has the same tow spacing for both the longitudinal tows and the transverse tows, and in the second layer, the longitudinal tows have a different tow spacing than the tow spacing of the transverse tows.

Example 15 includes the composite material of any of Examples 12-14, comprising a plurality of layers of fiber fabric, wherein a first layer of the fiber fabric comprises a non-crimp fabric and a second layer of the fiber fabric comprises a woven fabric.

Example 16 includes the composite material of any of Examples 12-15, comprising a plurality of layers of fiber fabric, wherein a first layer of the fiber fabric comprises a non-woven fabric and a second layer of the fiber fabric comprises a woven fabric.

Example 17 includes the composite material of any of Examples 12-16, comprising a plurality of layers of fiber fabric each having a plurality of longitudinal and transverse tows, wherein each of the layers of the fabric has a uniform spacing of the longitudinal and transverse tows within the layer, the uniform spacing of the longitudinal and transverse tows of at least one of the layers is different than the uniform spacing of the longitudinal and transverse tows of the other layers of the fabric, and the different uniform spacing is based on at least one of: a porosity requirement of the composite material and an infiltration requirement of the composite material.

Example 18 includes the composite material of any of Examples 12-17, wherein the fiber fabric comprises one or more of: silicon carbide, alumina, aluminosilicate, carbon, Kevlar, and spectra.

Example 19 includes the composite material of any of Examples 12-18, comprising a plurality of layers of fiber fabric, wherein a portion of the tows of one of the layers has a different fiber count than the tows of the other layers of the fabric, and the different fiber count is based on at least one of: a porosity requirement of the composite material and an infiltration requirement of the composite material.

Example 20 includes the composite material of any of Examples 12-19, comprising a plurality of layers of fiber fabric, wherein a portion of the tows of one of the layers has a different areal weight than the tows of the other layers of the fabric, and the different areal weight is based on at least one of: a porosity requirement of the composite material and an infiltration requirement of the composite material.

Example 21 includes the composite material of any of Examples 12-20, wherein the composite material comprises one or more of: a single twisted tow, a single untwisted tow, a plurality of twisted tows, and a served tow.

Example 22 includes the composite material of any of Examples 12-21, wherein the layers of fiber fabric comprise at least one of: silicon carbide, alumina, aluminosilicate, carbon, Kevlar, and spectra.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of fabricating a composite material part for a turbine engine, the composite material comprising fiber reinforcement densified by a ceramic matrix, the method comprising the steps of:
  employing a computing system to design a fiber architecture for a ceramic matrix composite based on performance requirements input; and
  creating the fiber architecture, the creating comprising:
    alternating layers of fiber fabric, each layer of fiber fabric comprising a plurality of fiber tows including longitudinal tows arranged in a longitudinal direction and a transverse tows arranged in a transverse direction with respect to the longitudinal tows, at least two of the layers having a different fiber tow spacing, and
    arranging the layers in a layup so as to create internal regions in which the fiber tows of adjacent layers do not overlap each other such that varying-sized void spaces are created within the fiber architecture, the varying-sized void spaces extending completely through the layers in a top view of an area of the layup,
  wherein the varying-sized void spaces form a portion of the area in the top view as open space, wherein the at least two layers include a first layer having a first plurality of first longitudinal tows that are uniformly spaced apart and a second layer overlying the first layer and having a second plurality of second longitudinal tows that are uniformly spaced apart,
  wherein two adjacent first longitudinal tows of the first plurality of longitudinal tows each have an inboard edge facing the other of the two adjacent first longitudinal tows, and
  wherein in the top view one of the second plurality of second longitudinal tows is spaced between the two adjacent first longitudinal tows and has a first edge that is aligned with the inboard edge of one of the two adjacent first longitudinal tows and a second edge that is spaced apart from the inboard edge of the other of the two adjacent first longitudinal tows for forming the varying-sized void spaces.

2. The method of claim 1, comprising orienting one of the layers of the fiber fabric at an acute angle with respect to the orientation of another of the layers of the fiber fabric in the composite material.

3. The method of claim 1, comprising positioning the fiber tows of one of the layers of the fiber fabric at an offset with respect to a position of the fiber tows of another of the layers of the fiber fabric in the composite material.

4. The method of claim 3, comprising positioning the longitudinal tows of the one of the layers of the fiber fabric at a longitudinal offset with respect to a position of the longitudinal tows of the another of the layers of the fiber fabric.

5. The method of claim 4, comprising positioning the transverse tows of the one of the layers of fiber fabric at a transverse offset with respect to a position of the transverse tows of the another of the layers of fiber fabric.

6. The method of claim 5, comprising spacing the longitudinal tows of the one of the layers of fiber fabric to align the longitudinal tows of the another of the layers of fiber fabric with one or more of the varying-sized void spaces between the longitudinal tows of the layer of fiber fabric.

7. The method of claim 6, comprising spacing the transverse tows of the one of the layers of fiber fabric to align the transverse tows of the another of the layers of fiber fabric with one or more of the varying-sized void spaces between the transverse tows of the layer of fiber fabric.

* * * * *